Sept. 6, 1927.
C. P. DENISON
1,641,580
ROAD GRADER
Filed Aug. 21, 1926
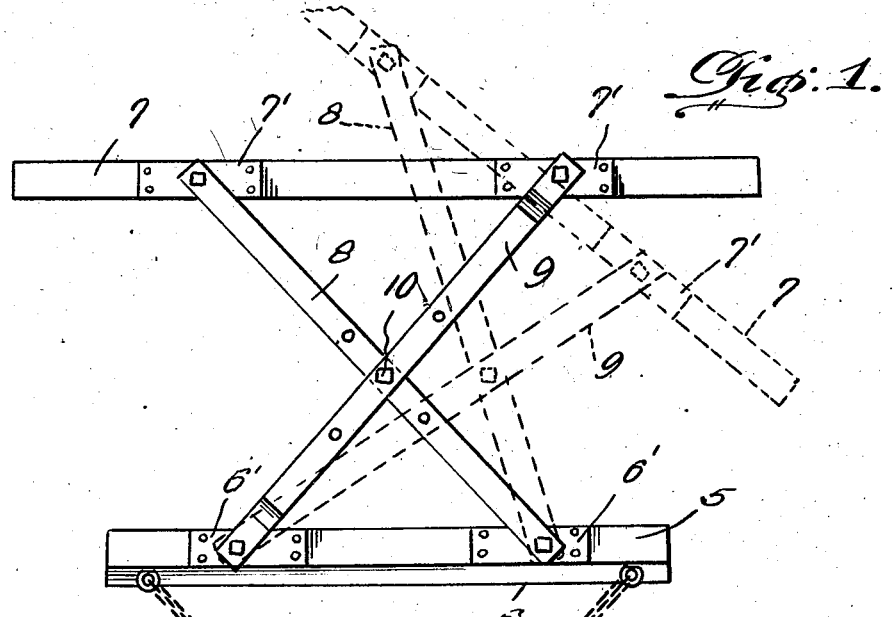
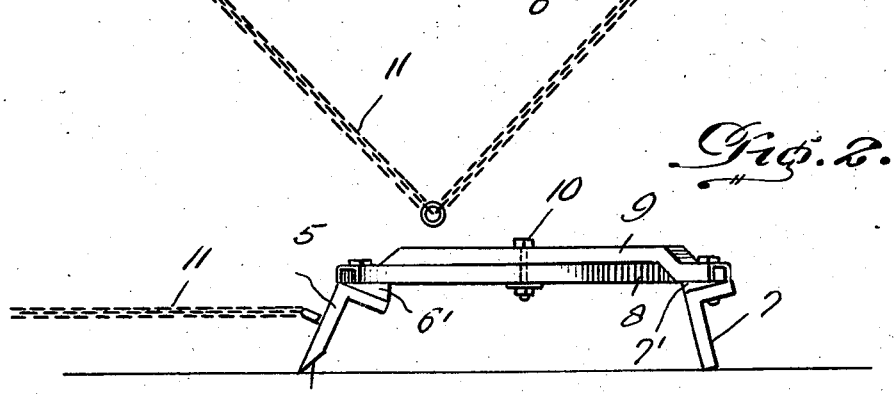
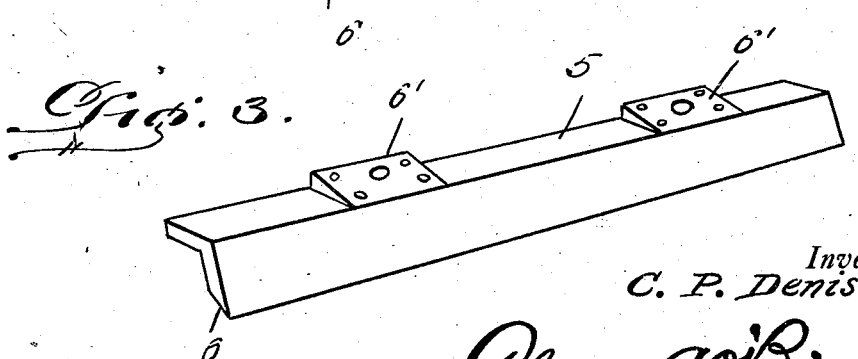
Inventor
C. P. Denison,
By Clarence A. O'Brien
Attorney Patented Sept. 6, 1927.

1,641,580

UNITED STATES PATENT OFFICE.

CHARLES P. DENISON, OF MAZEPPA, MINNESOTA.

ROAD GRADER.

Application filed August 21, 1926. Serial No. 130,605.

This invention relates to new and useful improvements in road grading machines and has for its primary object to provide a device of this character that is constructed so as to first cut the road surface and then properly spread the dirt after the cutting operation.

The invention further aims to provide a grader of this character wherein the spreading blade may be arranged in either parallel spaced relation with the cutting blade or diagonally in opposite directions with respect thereto as the occasion demands.

The invention further aims to provide a grading device wherein all of the cut surface of the road will be encountered by the spreading blade during the travel of the machine over the ground with the end in view that the usual strip or windrow of material along the middle or side of the road is not resultant.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts—

Figure 1 is a top plan view of a road grader constructed in accordance with the present invention, the spreading blade being disclosed by full lines in parallel relation with the cutting blade and in dotted line at a diagonal position with respect thereto.

Figure 2 is a side elevation of the grader for more clearly disclosing the construction of the cutting and spreading blades, and Figure 3 is a perspective of the cutting blade per se.

Now having particular reference to the drawing wherein there is disclosed the most practical embodiment of the invention with which I am at this time familiar, 5 represents a cutting blade of suitable length of an L-iron formation, the edge of the wider side of which is beveled as at 6 as to produce a cutting edge. The grader further constitutes the provision of a spreading blade 7 also of L-iron formation as disclosed in Figure 2. The length of the spreading blade 7 is substantially greater than that of the cutting blade 5 in order that the ends of the spreading blade will when the spreading blade is in parallel relation with the cutting blade overlap the ends of the cutting blade. Also, when this spreading blade 7 is arranged diagonally with respect to the cutting blade, the end thereof at the center of the road will overlap the inner end of the cutting blade so as to encounter all of the material that has been cut from the surface of the road. This obviously prevents a strip or windrow at the center or edge of the road.

Arranged in spaced relation upon the top side of the cutting blade 6 as well as the spreading blade 7 are tapered blocks 6'—6' and 7'—7', respectively. Interconnecting the cutting blade 5 and spreading blade 7 are diagonally extending cross bars 8 and 9, the opposite ends of which are respectively pivoted to the blade upon the top of the tapered blocks arranged upon said blade. The opposite ends of the bar 9 are offset downwardly so as to permit this bar to cross over the bar 8 as clearly disclosed in both Figures 1 and 2. The blocks 6'—6' upon the cutting blade 5 are so arranged that when the forward ends of the connecting bars 8 and 9 are pivoted thereto the cutting side of the blade will be tilted in a forward direction, while the blocks 7'—7' upon the spreading blade 7 are arranged reversely in order that the spreading blade will be tilted in a rearward direction to facilitate the spreading operation.

The connecting bars 8 and 9 are formed at their center with longitudinally spaced openings preferably three in number in order that the same may be bolted together at their center as at 10, or at opposite sides of their centers so that the blade 7 may be arranged in opposite diagonal relation with respect to the cutting blade 5 as indicated by the dotted line in Figure 1.

Attached to the front side of the cutting blade 5 is a suitable pull chain 11 in order that the grader may be pulled over the surface of the road by a tractor or other means.

It will thus be seen that I have provided a highly novel, simple, and efficient form of road grader that is well adapted for all the purposes heretofore designated, even though I have herein shown and described as consisting of certain details structural elements, it is nevertheless to be understood that some changes may be made therein without effecting the spirit and scope of the appended claim.

Having thus described the invention, what I claim is:—

In a road grader of the class described, a front cutter comprising an angle bar, the vertical flange of which is sharpened to provide a cutting edge, tapered integrally formed blocks on the horizontal flange of said bar, a relatively long spreader comprising a right angle bar adapted to be disposed either in parallelism to or diagonal to the cutter, and a pair of connecting strips disposed in intersecting crossed relation and connected at the forward ends to the blocks on said cutter, additional tapered blocks on said spreader, the connecting members being connected at their rear ends with said additional blocks.

In testimony whereof I affix my signature.

CHARLES P. DENISON.